(12) United States Patent
Tombers et al.

(10) Patent No.: US 12,244,110 B2
(45) Date of Patent: Mar. 4, 2025

(54) BUS BAR ADAPTER CONNECTING AT LEAST ONE PLUG-IN MODULE TO THE BUS BAR

(71) Applicant: Phoenix Contact GmbH & Co. KG, Blomberg (DE)

(72) Inventors: Roland Tombers, Paderborn (DE); Heinrich Kaeuper, Paderborn (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 357 days.

(21) Appl. No.: 17/802,154

(22) PCT Filed: Feb. 23, 2021

(86) PCT No.: PCT/EP2021/054430
§ 371 (c)(1),
(2) Date: Aug. 25, 2022

(87) PCT Pub. No.: WO2021/170574
PCT Pub. Date: Sep. 2, 2021

(65) Prior Publication Data
US 2023/0361518 A1      Nov. 9, 2023

(30) Foreign Application Priority Data
Feb. 28, 2020   (BE) .................................. 2020/5134

(51) Int. Cl.
*H01R 25/14*      (2006.01)
(52) U.S. Cl.
CPC .................................. *H01R 25/142* (2013.01)

(58) Field of Classification Search
CPC ..... H01R 25/142; H01R 25/16; H01R 25/162
See application file for complete search history.

(56) References Cited

U.S. PATENT DOCUMENTS

| 4,472,764 A * | 9/1984 | Richard | H01R 9/2625 439/922 |
| 8,072,728 B2 * | 12/2011 | Willmann | H02H 9/06 361/119 |

(Continued)

FOREIGN PATENT DOCUMENTS

| DE | 19524123 C1 | 2/1997 |
| DE | 10061940 A1 | 7/2002 |

(Continued)

*Primary Examiner* — Vanessa Girardi
(74) *Attorney, Agent, or Firm* — LEYDIG, VOIT & MAYER, LTD.

(57) ABSTRACT

A current bar adapter for electrically connecting at least one plug-in module to at least one current bar and/or contact bar of an insert part which is inserted into a mounting rail, a number of current bars and/or contact bars that extend in a longitudinal direction of the mounting rail being arranged in the insert part, the current bar adapter including: a clamping device for snapping the current bar adapter onto the mounting rail; at least one interface for contacting the at least one plug-in module; and at least one contact element for contacting the at least one current bar and/or contact bar and establishing an electrical connection between the current bar and/or contact bar and the at least one plug-in module.

12 Claims, 7 Drawing Sheets

(56) References Cited

U.S. PATENT DOCUMENTS

| | | | | |
|---|---|---|---|---|
| 8,209,455 | B2* | 6/2012 | Rasche | G05B 19/054 |
| | | | | 710/301 |
| 8,668,518 | B2* | 3/2014 | Wu | H01R 25/142 |
| | | | | 439/709 |
| 8,968,016 | B1* | 3/2015 | Wu | H01R 9/2608 |
| | | | | 439/214 |
| 9,583,849 | B1* | 2/2017 | Wu | H01R 9/2608 |
| 10,483,725 | B2* | 11/2019 | Merz | H01R 25/162 |
| 2007/0246256 | A1 | 10/2007 | Eusterholz et al. | |

FOREIGN PATENT DOCUMENTS

| | | |
|---|---|---|
| DE | 202006006659 U1 | 7/2006 |
| DE | 202006006615 U1 | 9/2006 |
| DE | 102010016865 A1 | 11/2011 |
| EP | 2128941 A1 | 12/2009 |
| WO | WO 2017/153507 A1 | 9/2017 |

\* cited by examiner

BUS BAR ADAPTER CONNECTING AT LEAST ONE PLUG-IN MODULE TO THE BUS BAR

CROSS-REFERENCE TO PRIOR APPLICATIONS

This application is a U.S. National Phase application under 35 U.S.C. § 371 of International Application No. PCT/EP2021/054430, filed on Feb. 23, 2021, and claims benefit to Belgian Patent Application No. BE 2020/5134, filed on Feb. 28, 2020. The International Application was published in German on Sep. 2, 2021 as WO/2021/170574 under PCT Article 21(2).

FIELD

The present invention relates to a current bar (also: bus bar) adapter for electrically connecting at least one plug-in module to at least one current bar extending in a longitudinal direction of a mounting rail (also: support rail). The current bar may be attached to an insert part, which is arranged (e.g., placed) in the mounting rail. The current bar adapter is mechanically connected (e.g., fastened) to the mounting rail.

BACKGROUND

Mounting rails are frequently used in electrical engineering for mounting electrical equipment, for example plug-in modules, e.g. in control cabinets or distribution boxes. The mounting rails are usually profile rails made of metal and have, for example, a hat-shaped or a G-shaped profile. Mounting rails can also have current bars, for example if an insert part is inserted into the cavity (also: recess) of the mounting rail to which one or more current bars are attached. Mounting rails of this type enable simple system expansion by plugging-in further plug-in modules, and maintenance costs are reduced because the step of plugging-in readily establishes an electrical plug-in connection with at least one current bar, thus reducing the amount of wiring required. The plug-in modules are used, for example, to control motors or other electrical systems and are in particular measuring and switching devices such as relays, current transformers, multiplexers, circuit breakers and isolating amplifiers.

A product description from Phoenix Contact Deutschland GmbH, https://www.phoenixcontact.com/de/produkte/2969401, discloses a mounting rail bus connector (T-bus) 11 for use with a top-hat rail 10, shown in FIG. 1. The T-bus 11 has two lateral clamping devices 12, with which the T-bus 11 "snaps on" to the lateral (or edge) ends of the top-hat rail 10 during mounting. The T-bus 11 has a plug-in connection with electrical contacts 15 on each of its long sides 13, so that several T-buses 11 arranged next to each other on the top-hat rail 10 are electrically connected to each other. The electrical contacts 15 transmit a supply voltage in particular, but can also be used to transmit system and data transmission signals.

On the side facing away from the top-hat rail 10, the T-bus 11 has two interfaces 13, onto each of which a plug-in module can be plugged. The top-hat rail 10 thus allows a large number of plug-in modules to be mounted, provided that the length of the top-hat rail 10 is selected accordingly. The T-bus 11 allows both a wide plug-in module to be plugged in, whereby only one interface 13 needs to be contacted, and two narrow plug-in modules to be plugged into one of the two interfaces 13.

FIG. 2 shows a universal mounting rail system "Power Rail" 20 of type UPR-05 with a top-hat rail 21 offered by Pepperl+Fuchs AG. This mounting rail system is also described in the associated data sheet "038005_ger.pdf". A special feature is an insert part 22 consisting of plastic, which is provided with current bars 23 that extend in the longitudinal direction, and contact bars 24. In particular, the current bars 23 are usable for a power supply and the contact bars 24 include a conductor (or line) for a collective error message and two conductors (or lines) for a bus connection. It is noted here that the terms current bar and contact bar can be used interchangeably, since current is also conducted through the contact bars. Two non-conductive partitioning walls 25 are arranged on the center of the insert part 22 for spatial separation of the power rails 23 from the contact bars 24. The power rail 20 enables, for example, the supply and bus connection for plugged-on plug-in modules of a "K-System" of the Pepperl+Fuchs AG.

DE 100 61 940 A1 describes a current bar adapter which has channels extending longitudinally on its upper side to accommodate contact bars and is provided with a cover. It has projecting insulating tongues on one of its end faces for the contact-proof termination of end sections of the contact bar. This allows plug-in modules to be plugged in and exchanged safely.

SUMMARY

In an embodiment, the present invention provides a current bar adapter for electrically connecting at least one plug-in module to at least one current bar and/or contact bar of an insert part which is inserted into a mounting rail, a number of current bars and/or contact bars that extend in a longitudinal direction of the mounting rail being arranged in the insert part, the current bar adapter comprising: a clamping device configured to snap the current bar adapter onto the mounting rail; at least one interface configured to contact the at least one plug-in module; and at least one contact element configured to contact the at least one current bar and/or contact bar and to establish an electrical connection between the current bar and/or contact bar and the at least one plug-in module.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
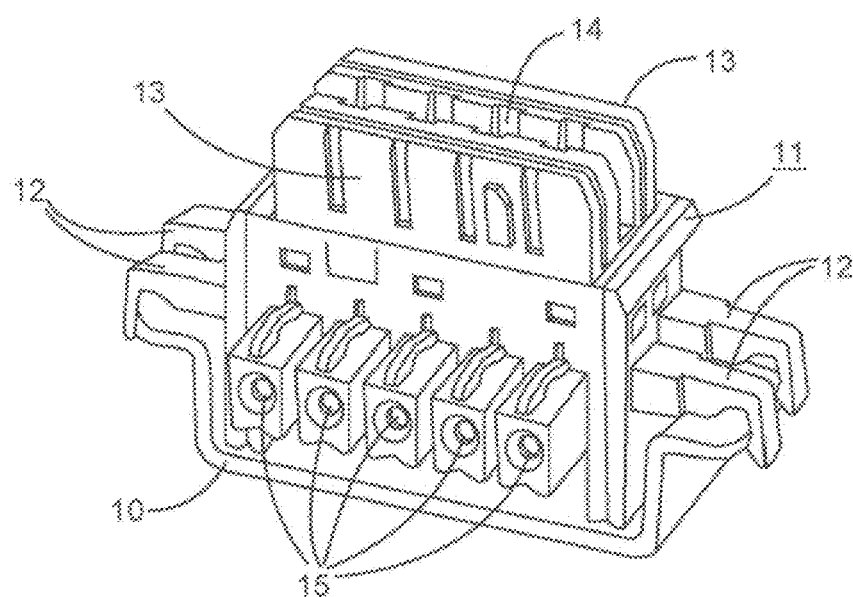
FIG. 1 shows a mounting rail bus connector according to the state of the art.

In an embodiment, the present invention extends the range of use of plug-in modules of the type described above.

The current bar adapter comprises clamping devices via which the current bar adapter can be snapped onto a mounting rail, at least one interface for contacting a plug-in module and at least one contact element for contacting a current bar of the mounting rail to establish an electrical connection between the contact bar and the current bar adapter. This establishes an electrical connection between the plug-in module and the contact bar after the plug-in module has been plugged on.

According to a preferred variant, the current bar adapter is designed for a mounting rail with a hat-shaped profile. An insert part is placed in the mounting rail, on which several current bars and/or contact bars are arranged. The current bar adapter preferably comprise clamping devices which comprise at least one latching hook (or snap-in hook) with which the clamping devices hook (or clasp) under the edge of the lateral support surfaces (or bearing surfaces) of a mounting rail with a hat-shaped profile.

In a further embodiment, the clamping devices are arranged laterally on the current bar adapter, the clamping devices comprising, at least on one side, two adjacent latching hooks with a spacing, the width of which latching hooks is dimensioned such that, during a swiveling-in operation of two narrow plug-in modules, in each case a spring element (or resilient element) of the respective plug-in module can hook in next to a respective latching hook under the edge of the lateral support surfaces of the mounting rail.

In a preferred embodiment, the current bar adapter is designed (or configured) in such a way that the current bar adapter allows a plug-in module to be swung open from both sides. In particular, the connector face of one or two interfaces of the current bar adapter is designed to allow a wide plug-in module or two narrow plug-in modules to be swiveled in from one side, with the connector face for swiveling in from the other side being mirrored on the center line of the mounting rail. This means that different types of plug-in modules with mirrored electrical assignment from different manufacturers or from the same manufacturer can be used for the current bar adapter.

To enable this, different current bar adapters are required. One current bar adapter is designed for swiveling in plug-in modules from one side and the other current bar adapter is designed for swiveling in plug-in modules of the other type, which are swiveled in from the other side. Therefore, one and the same current bar adapter cannot be used for both types of plug-in modules.

In one variant, the contact element of the current bar adapter has a first contact tongue for contacting the at least one current bar of the insert part and a second contact tongue for establishing an electrical connection with a contact of the plug-in module and a third contact tongue for establishing an electrical connection with a second plug-in module. Thus, one wide or two narrow plug-in modules can be contacted via such special contact elements.

A particularly advantageous extended embodiment is that the first, second and third contact tongues are each complemented (or supplemented) by an opposite contact tongue to form a contact terminal. This ensures reliable contacting.

Another particularly advantageous measure is that the second and third contact tongues are rotated by 90° relative to the first contact tongue. This then allows the plug-in modules to be swiveled in laterally from both sides without bending the contact tongues.

In particular, it is advantageous if the current bar adapter has at least two contact elements for contacting to the at least two current bars of the insert part for the power supply.

In an extended embodiment, the current bar adapter has at least one further contact element for contacting to at least one further contact bar of the insert part for a voltage supply and/or system or data communication between the plug-in modules mounted at different locations on the mounting rail.

In another embodiment, the current bar adapter comprises a cross-contacting for power supply and/or system or data communication between adjacent current bar adapters.

The present description illustrates the principles of the disclosure according to the invention. It is thus understood that those skilled in the art will be able to conceive various embodiments which, although not explicitly described herein, embody principles of the disclosure according to the invention and are also intended to be protected in scope.

Figure 3:
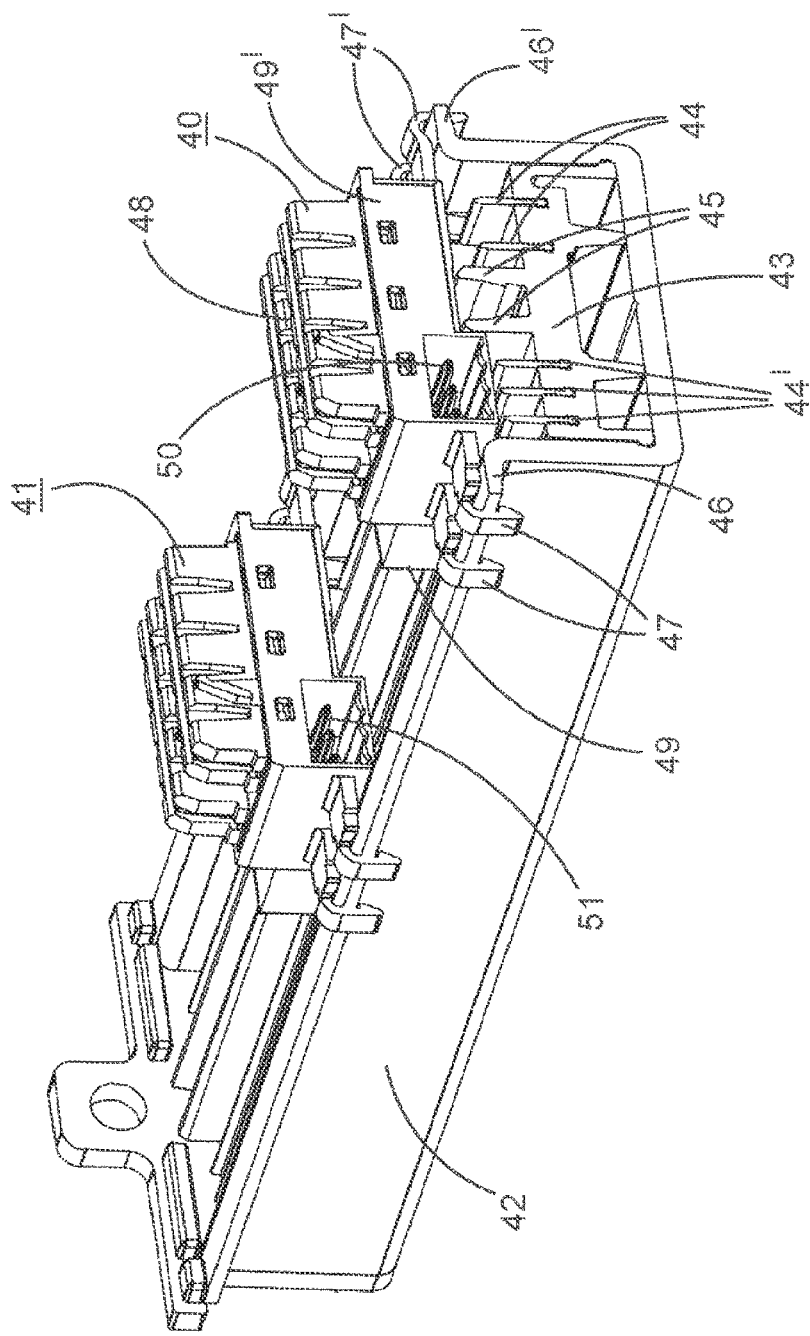
FIG. 3 shows two current bar adapters according to embodiments of the invention, which are placed on a top-hat rail according to FIG. 2.

FIG. 3 schematically shows two identically constructed current bar adapters 40, 41, which are snapped onto a mounting rail 42. The mounting rail 42 comprises an insert part 43 with, in relation to the mounting rail, two current bars 44 and three contact bars 44' that extend in the longitudinal direction. The current bars 44 can be used in particular for a power supply, and the contact bars 44' comprise, for example, one conductor for a collective error message and two conductors for a bus connection. It is noted here that the terms conductor bar and contact bar can also be used synonymously, since current is also conducted through the contact bars. They can be designed in such a way, in particular through the choice of conductor material, that they cannot carry as much current for the power supply of the various connected modules. If this is not important, they can also be designed in the same way as the contact bars 44. Two non-conductive partitioning walls 45 are arranged on the center of the insert part 43 for spatial and electrical separation of the contact bars 44 from the contact bars 44'. Depending on the length of the mounting rail 42, a corresponding number of current bar adapters 40, 41 can be snapped on.

The current bar adapter 40 has lateral clamping devices 47, 47' with which the current bar adapter 40 snaps onto the mounting rail 42 on lateral support surfaces 46, 46' of the mounting rail 42 during assembly. In this case, the two clamping devices 47 snap onto the support surface 46 and the two clamping devices 47' snap onto the support surface 46', so that the current bar adapter 40 is firmly seated on the mounting rail 42, but can be removed from the mounting rail 42 again in a simple manner, without a tool. On the upper side, the side facing away from the mounting rail 42, the current bar adapter 40 has two interfaces 48, onto each of which a plug-in module can be snapped. The interfaces 48 have the function of an interface for the plug-in module with a corresponding number of plug contacts.

The mounting rail 42 has, for example, a hat-shaped profile with two lateral support surfaces 46, 46' and a recess located between the support surfaces 46, 46', into which the insert part 43 is inserted. Preferably, the mounting rail 42 is designed as a top-hat rail, but other embodiments, for example mounting rails having a G-shaped profile, can also be used.

Figure 2:
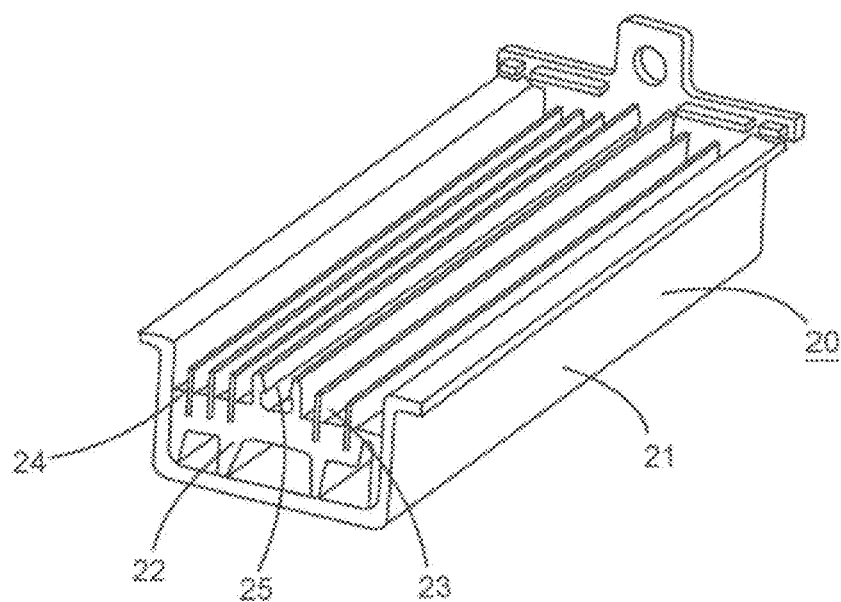
FIG. 2 shows a top-hat rail with an insert part according to the state of the art.

In a preferred embodiment, the mounting rail 42 and the insert part 43 are identical to the arrangement described on the basis of FIG. 2, and the interfaces 48 are identical to the interface 13 of FIG. 1, so that plug-in modules intended for use with the mounting rail bus connector 11 of FIG. 1 can also be used with the current bar of FIG. 2. In particular, the interfaces 48 also allow both a wide plug-in module and two narrow plug-in modules to be plugged in.

At least one or each of the clamping devices 47, 47' has at least one latching hook which hooks under the edges of the lateral support surfaces 46, 46' of the top-hat rail 42. In this case, the clamping device 47 has two detachable latching hooks provided with a spacing, and the clamping device 47' likewise. This allows the current bar adapters 40, 41 to be slipped onto and removed from the top-hat rail 42 without the use of a tool or merely by using a screwdriver.

In another embodiment, the current bar adapter 40 has a plug connection 50 with electrical contacts on its two longitudinal sides 49, 49', in the longitudinal direction of the mounting rail 42. On the longitudinal side 49', the contact pins of the plug connection 50 are shown. On the other longitudinal side 49 are the matching sockets for the plug-in connection 50. The current bar adapter 41 has a corresponding plug-in connection 51 with electrical contacts, so that the current bar adapters 40, 41 are electrically connected to one another by the plug-in connections 50, 51 when they are pushed towards one another after being placed on the mounting rail 42. The electrical contacts of the plug-in connections 50, 51 can be used, for example, to transmit a supply voltage, but can also transmit system or data transmission signals.

Figure 4:
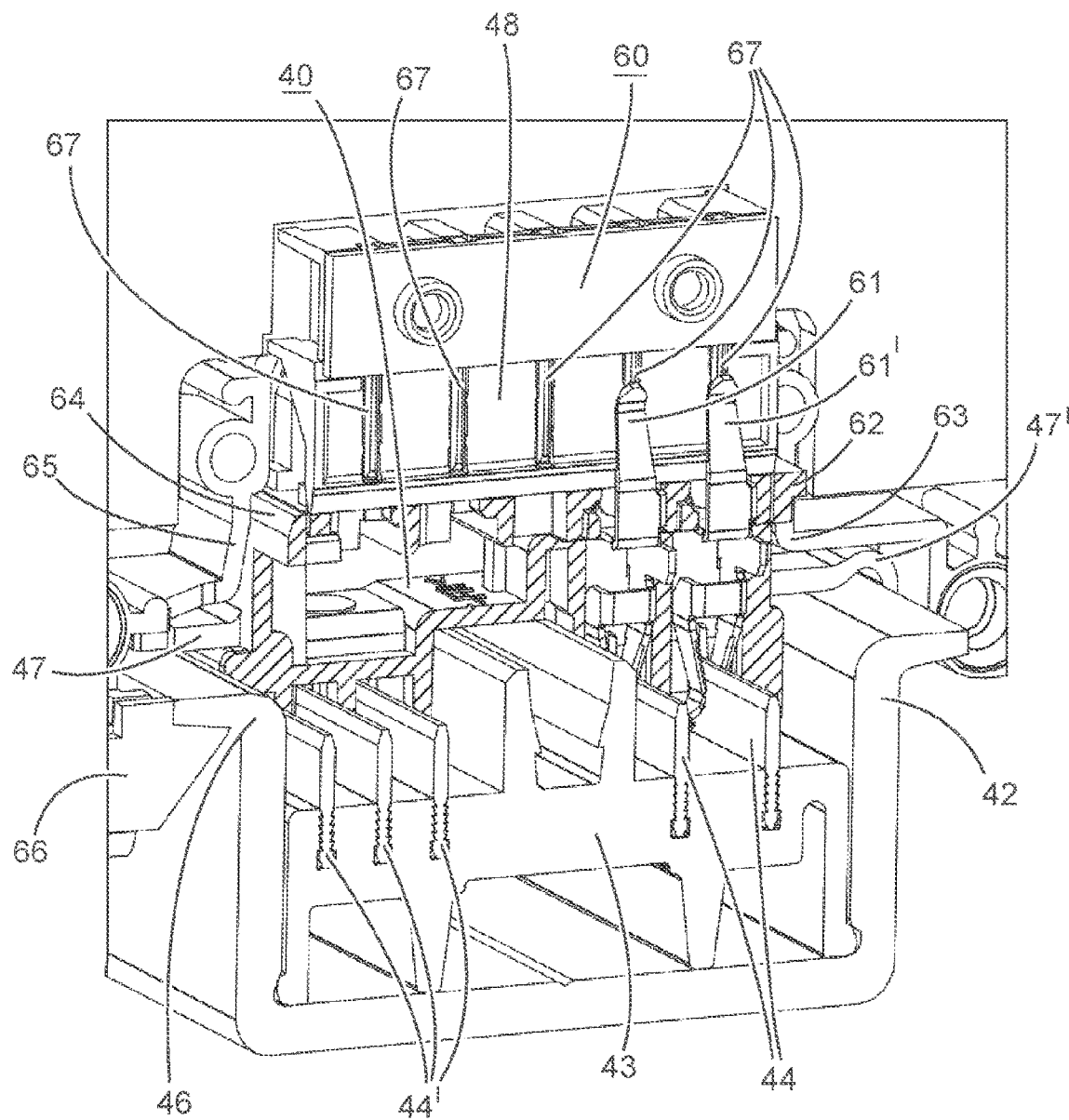
FIG. 4 shows a detailed view of the current bar adapter according to the embodiments of the invention, which is snapped onto a mounting rail.

FIG. 4 schematically shows the current bar adapter 40, which is placed on the mounting rail 42, and the insert part 43 with the current bars 44 and contact bars 44', as described above with reference to FIG. 3. Further shown is a portion of a plug-in module 60 which is snapped onto the current bar adapter 40 and the mounting rail 42. The plug-in module 60 and the current bar adapter 40 are shown here partially in a tear drawing so that two contact elements 61, 61' of the current bar adapter 40 are visible, each contacting one of the current bars 44 for establishing an electrical connection between the current bars 44 and contacts 67 of the plug-in module 60. The contact bars 44' are not contacted in this embodiment example.

In this embodiment, the plug-in module 60 is first placed on the side of the supply voltages on the current bar adapter 40, and then the plug-in module 60 is swiveled to the other side. So that the contacts of the plug-in module 60 and the current bar adapter 40 are not damaged during this sideways plugging, the current bar adapter 40 has a connector face that is designed to be swung open from the right side. Here, the correct orientation of the contact elements positioned in the current bar adapter 40 is important. This will be explained further below in connection with FIG. 8. The plug-in module 60 further has a displaceable retaining element 66 which engages under the lateral support surface 46 of the mounting rail 42.

Figure 5:
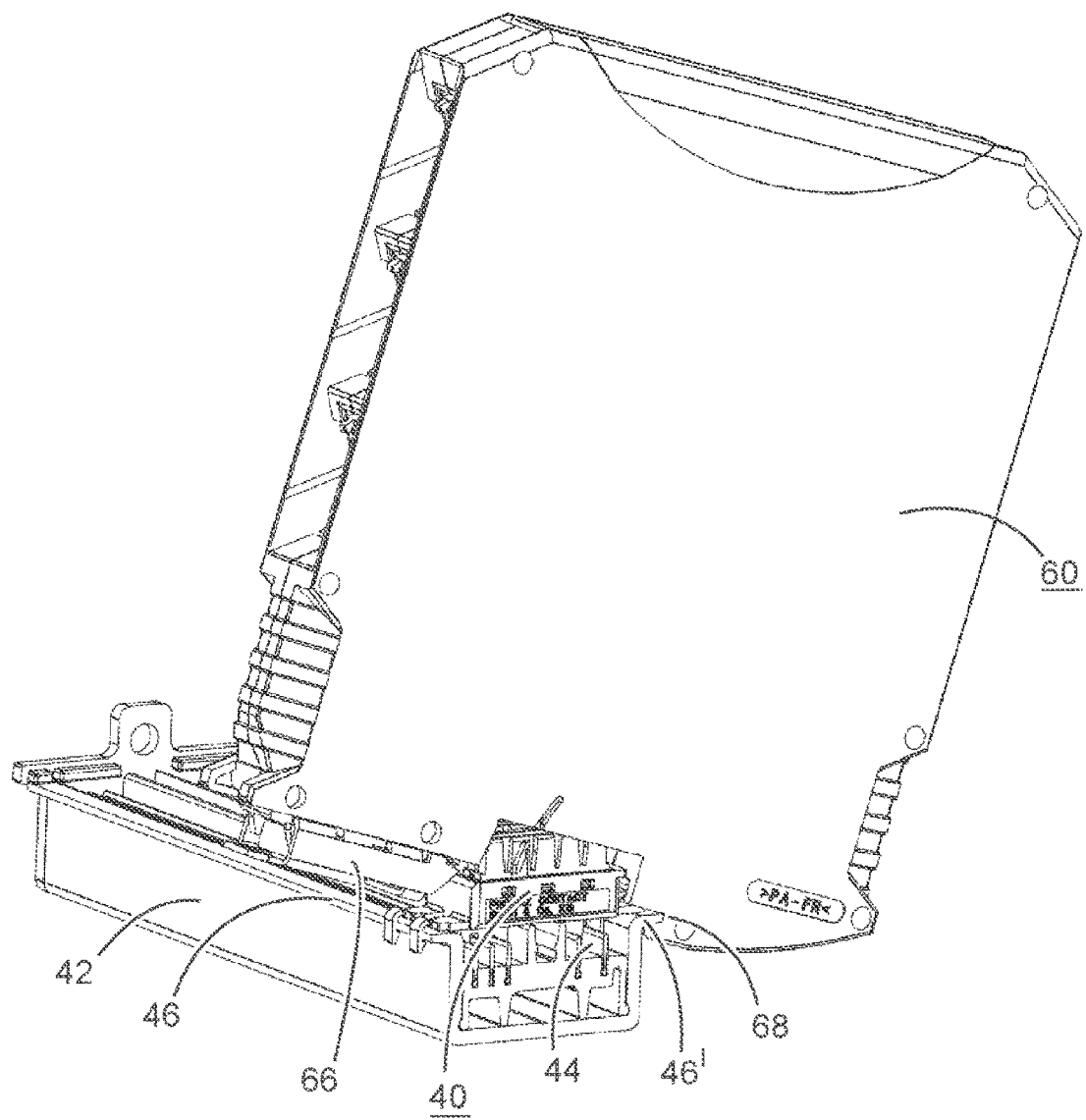
FIG. 5 shows a process of swiveling of a wide plug-in module onto the current bar adapter according to the embodiment of FIG. 4.

The swiveling of the plug-in module 60 onto the current bar adapter 40 and the mounting rail 42 is now explained in more detail with reference to FIG. 5 and FIG. 6. The plug-in module 60 is first placed on the side of the mounting rail 42 and the current bar adapter 40 on which the current bars 44 with the supply voltages are located, FIG. 5. Here, a projection 68 of the housing contour of the plug-in module 60 hooks firmly under the right lateral support surface 46' of the mounting rail 42.

The plug-in module 60 is then swiveled to the other side so that the sliding retaining element 66 of the plug-in module 60, slides over the edge of the top-hat rail 42, whereby the sliding retaining element 66 engages under the edge of the top-hat rail 42 next to the clamping device 47 and creates a stable but detachable connection with the top-hat rail 42.

Figure 6:
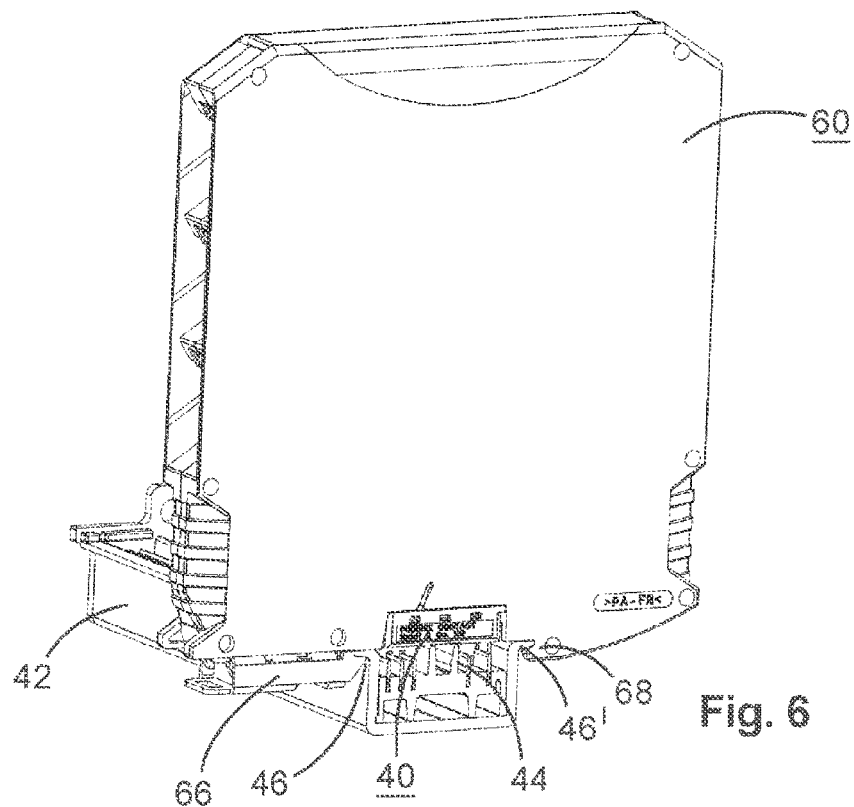
FIG. 6 shows the wide plug-in module of FIG. 5 after the process of swiveling in a state snapped onto the current bar adapter according to the embodiments of the invention.

FIG. 6 shows the current bar adapter 40 and the mounting rail 42 after the plug-in module 60 has been placed on them. The plug-in module 60 is firmly hooked with the projection 68 under the lateral support surface of the mounting rail 42, on the side of the supply voltages. On the other side, the plug-in module 60 is detachably hooked under the lateral support surface of the mounting rail 42, as the retaining element 66 is displaceable. The plug-in module 60 has a particularly stable attachment to the mounting rail 42, since the plug-in module 60 has a fixed housing contour on one side, which rests firmly against the mounting rail 42 on one side, while the plug-in module 60 is held on the other side by the retaining element 66 of the plug-in module 60, which hooks under the other lateral end of the mounting rail 42.

Figure 7:
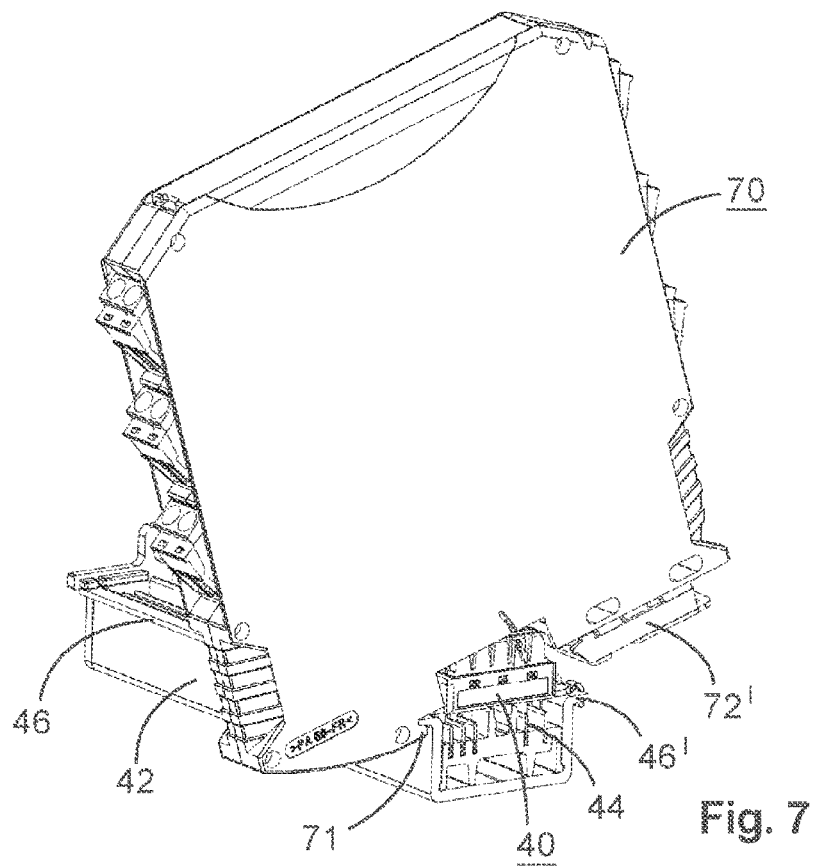
FIG. 7 shows the process of swiveling a wide plug-in module of a different type onto the current bar adapter according to the associated embodiment of the invention.

It is also possible to swivel a plug-in module 70 of a different type, which has its sides swapped with regard to the movable holding element and with regard to the connector face, onto the mounting rail 42 and the correspondingly designed current bar adapter 40, and this is shown in FIG. 7. The correspondingly designed current bar adapter has a connector face that is directed to the left side. This also means that it has sliding surfaces which are beveled to the right side. In FIG. 3, a sliding surface can be seen at the first interface 48 which is beveled to the left side because this plug-in module 60 is swiveled in from the right, see FIG. 5.

Figure 8:
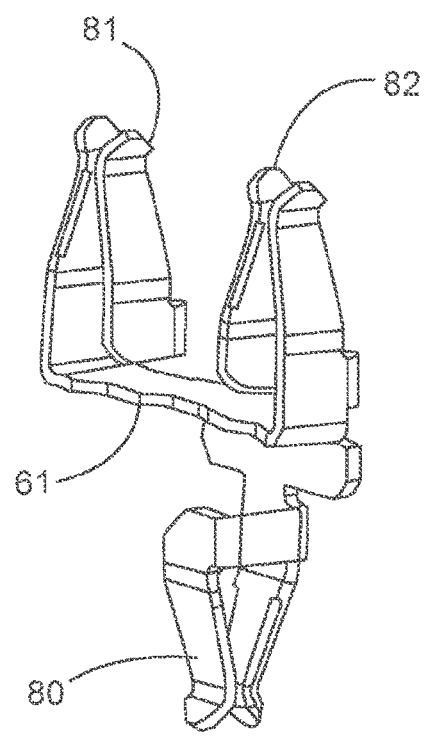
FIG. 8 shows a contact element of the current bar adapter.

A preferred embodiment of the contact element 61 of the current bar adapter 40 is shown in FIG. 8. The contact element 61 has a first contact tongue 80 for contacting a first of the current bars 44, as well as a second contact tongue 81 for establishing an electrical connection with a first narrow plug-in module and a third contact tongue 82 for establishing an electrical connection with a second narrow plug-in module. In FIG. 8, the first, second and third contact tongues are each complemented with opposing contact tongues to form contact terminals. This creates tight-fitting, reliable contacts. In FIG. 8, it is clearly visible that the contact tongues 81, 82 are rotated by 90° relative to the contact tongue 80. They are thus aligned in the swivel direction of the plug-in modules and can thus contact the plug-in modules whether they are swiveled in from the left or right without bending. The contact element 61' is identical to the contact element 61 and makes contact with the second of the current bars 44. In this way, the interface 48 enables both a wide plug-in module and two narrow plug-in modules to be plugged onto the current bar adapter 40. In this case, the contact elements 61, 61' effect, for example, the transmission of a supply voltage from the contact bars 44 to two narrow plug-in modules which have been plugged on.

Figure 9:
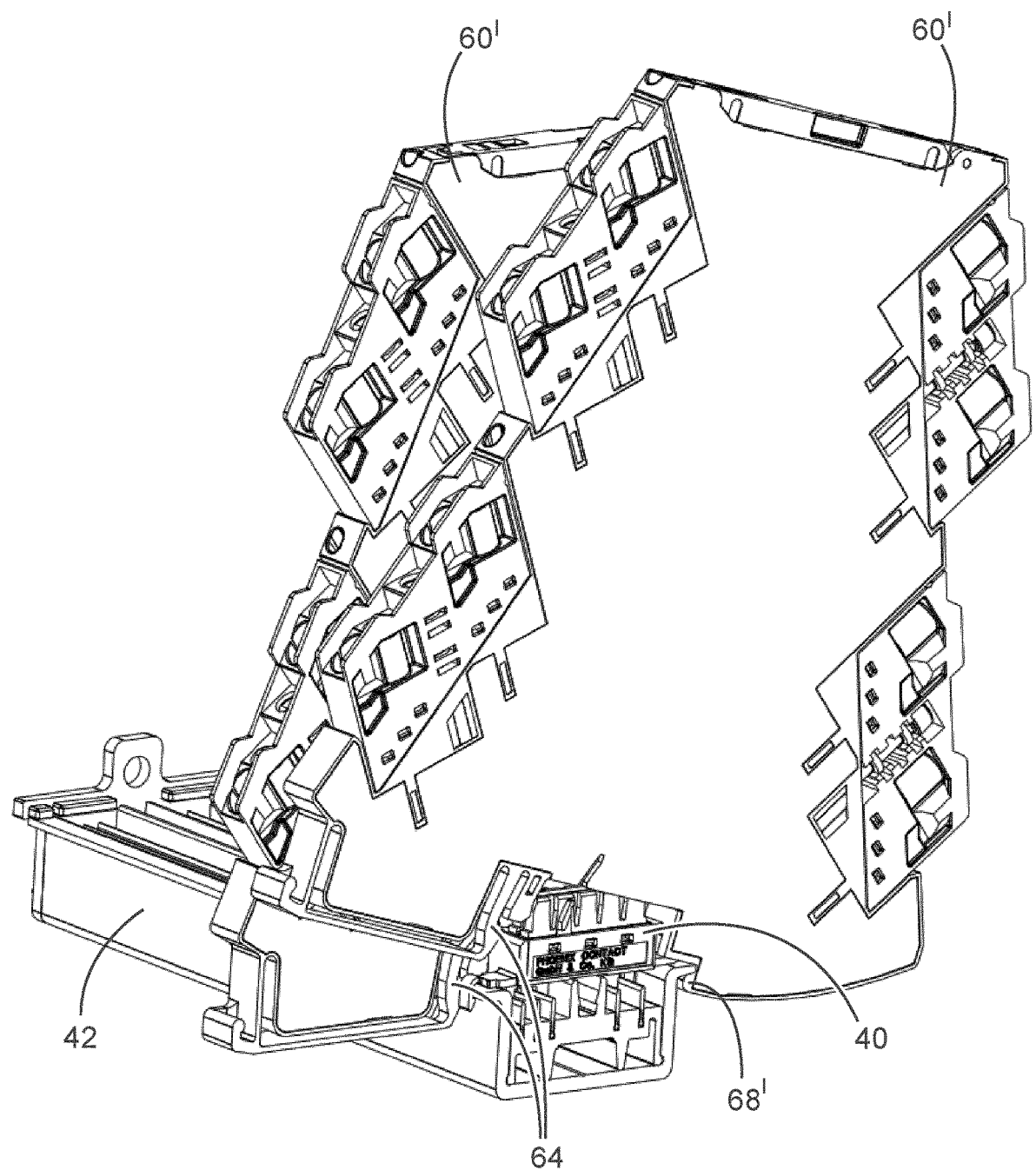
FIG. 9 shows the process of swiveling a narrow plug-in module onto the current bar adapter according to an embodiment of the invention, onto which a narrow plug-in module is already plugged.

The plugging of two narrow plug-in modules 60' onto a current bar adapter 40 with two interfaces is shown in FIG. 9. These do not have sliding retaining elements. Instead, they have a spring element 64 made of plastic that hooks under the lateral end of the mounting rail 42. The narrow plug-in modules 60' can also be of two different types, one for swinging in from one side and one for swinging in from the other side. The projection that hooks under the lateral support surface of the mounting rail 42 is designated with reference number 68'.

Figure 10:
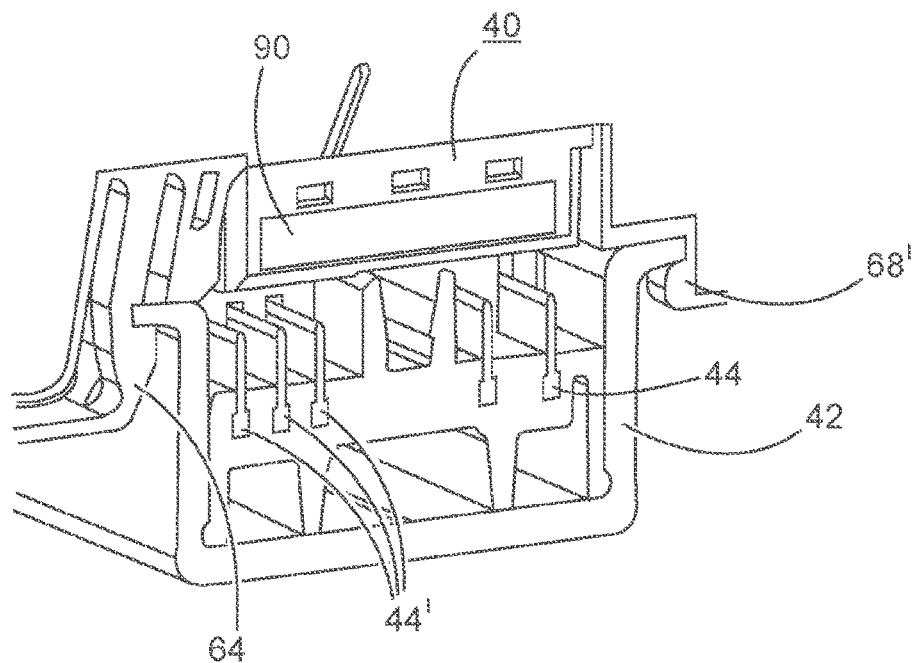
FIG. 10 shows the front side of the current bar adapter, with the snapped-on narrow plug-in module according to the embodiment of FIG. 9.

In another embodiment of the invention, the current bar adapter 40 has a large clearance area 90, shown in FIG. 10, which is still visible when a plug-in module 60 or 70 is snapped on. Advantageously, this clearance area can be used for a label, for example, a company name of the manufacturer. The open space exists on both sides of the current bar adapter 40. FIG. 10 also shows that this current bar adapter thus does not have a connector that would be located above the contact bars 44' shown on the left side. Instead, these contact bars of the bus connection lines can be contacted by further contact elements 61 in the current bar adapter. Two plug-in modules of the same manufacturer mounted at different positions on the mounting rail 42 could both contact the current bars of the bus connection lines of the insert part and communicate with each other via them. System or data communications could be carried out via the bus connection lines. Even if other plug-in modules of other manufacturers are inserted between these two plug-in modules, communication can take place if these plug-in modules are not connected to the bus connection line current bars.

The disclosure is not limited to the embodiments described herein. There is room for various adaptations and modifications that the person skilled in the art would consider, based on her/his knowledge of the art, as also pertaining to the disclosure.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

Top-hat rail 10
Mounting rail bus connector (T-bus) 11
Clamping devices 12
Interface 13
electrical contacts 15
Power rail 20
Top-hat rail 21
Insert part 22
Conductor bars 23
Contact bars 24
Partitioning walls 25
Current bar adapter 40, 41
Mounting rail 42
Insert part 43
Conductor bars 44
Contact bars 44
Partitioning walls 45
Lateral support surfaces of the mounting rail 46, 46'
Clamping devices 47, 47'
Interfaces 48
Long sides of the current bar adapter 49, 49'
Plug connection of the current bar adapter 40 50
Plug connection of the current bar adapter 41 51
Wide plug-in module 60
Narrow plug-in module 60'
Contact element 61, 61'
Spring element 64
Sliding retaining element 66
Sliding contact of the plug-in module 67
Protrusion of the housing contour of the wide plug-in module 68
Protrusion of the housing contour of the narrow plug-in module 68'
Second plug-in module 70
Protrusion of the second plug-in module 71
Sliding retaining device of the second plug-in module 72'
Contact tongues 80, 81, 82
One of two clearance areas of a current bar adapter 90

The invention claimed is:

1. A current bar adapter for electrically connecting at least one plug-in module to at least one current bar and/or contact bar of an insert part which is inserted into a mounting rail, a number of current bars and/or contact bars that extend in a longitudinal direction of the mounting rail being arranged in the insert part, the current bar adapter comprising:
   a clamping device configured to snap the current bar adapter onto the mounting rail;
   at least one interface configured to contact the at least one plug-in module; and
   at least one contact element configured to contact the at least one current bar and/or contact bar and to establish an electrical connection between the current bar and/or contact bar and the at least one plug-in module.

2. The current bar adapter of any claim 1, further comprising:
   a connector configured to cross-contact a power supply and/or a system or data communication.

3. The current bar adapter of claim 1, wherein the clamping device comprises at least one latching hook with which the clamping device hooks under an edge of lateral support surfaces of a support bar with a hat-shaped profile.

4. The current bar adapter of claim 3, wherein the clamping device comprises, at least on one side, two adjacent latching hooks with a spacing, widths of which are dimensioned such that, during swiveling-in of two narrow plug-in modules, a respective spring element of the respective plug-in module is hookable in each case adjacent to a latching hook under the edge of the lateral support surfaces of the mounting rail.

5. The current bar adapter of claim 1, wherein a connector face of the current bar adapter is configured in each case to swivel in a wide or two narrow plug-in modules from one side, and
wherein the connector face for swiveling in from an other side is mirrored in each case at a center line of the mounting rail.

6. The current bar adapter of claim 5, wherein the current bar adapter is configured for plug-in modules of a first type that are swung in from one side and the current bar adapter is configured for plug-in modules of a second type that are swung in from the other side.

7. The current bar adapter of any claim 1, wherein the current bar adapter comprises at least two contact elements configured to contact the at least two current bars of the insert part.

8. The current bar adapter of claim 7, further comprising:
at least one further contact element configured to contact at least one further contact bar of the insert part for a voltage supply and/or system or data communication between the plug-in modules mounted at different locations of the mounting rail.

9. The current bar adapter of claim 1, wherein the contact element comprises a first contact tongue configured to contact the at least one current bar of the insert part, and a second contact tongue configured to establish an electrical connection with a contact of the plug-in module and a third contact tongue configured to establish an electrical connection with a second plug-in module.

10. The current bar adapter claim 9, wherein the first, second, and third contact tongues are each complemented by an opposing contact tongue to form a first, second, and third contact terminal, respectively.

11. The current bar adapter of claim 9, wherein the contact element comprises a third contact tongue configured to establish an electrical connection with a second narrow plug-in module that is plugged onto the current bar adapter adjacent a first narrow plug-in module.

12. The current bar adapter of claim 11, wherein the second and third contact tongues are rotated 90° relative to the first contact tongue.

* * * * *